R. L. TOLSON.
TRACTOR.
APPLICATION FILED JAN. 11, 1918.
1,323,126.
Patented Nov. 25, 1919.
2 SHEETS—SHEET 1.
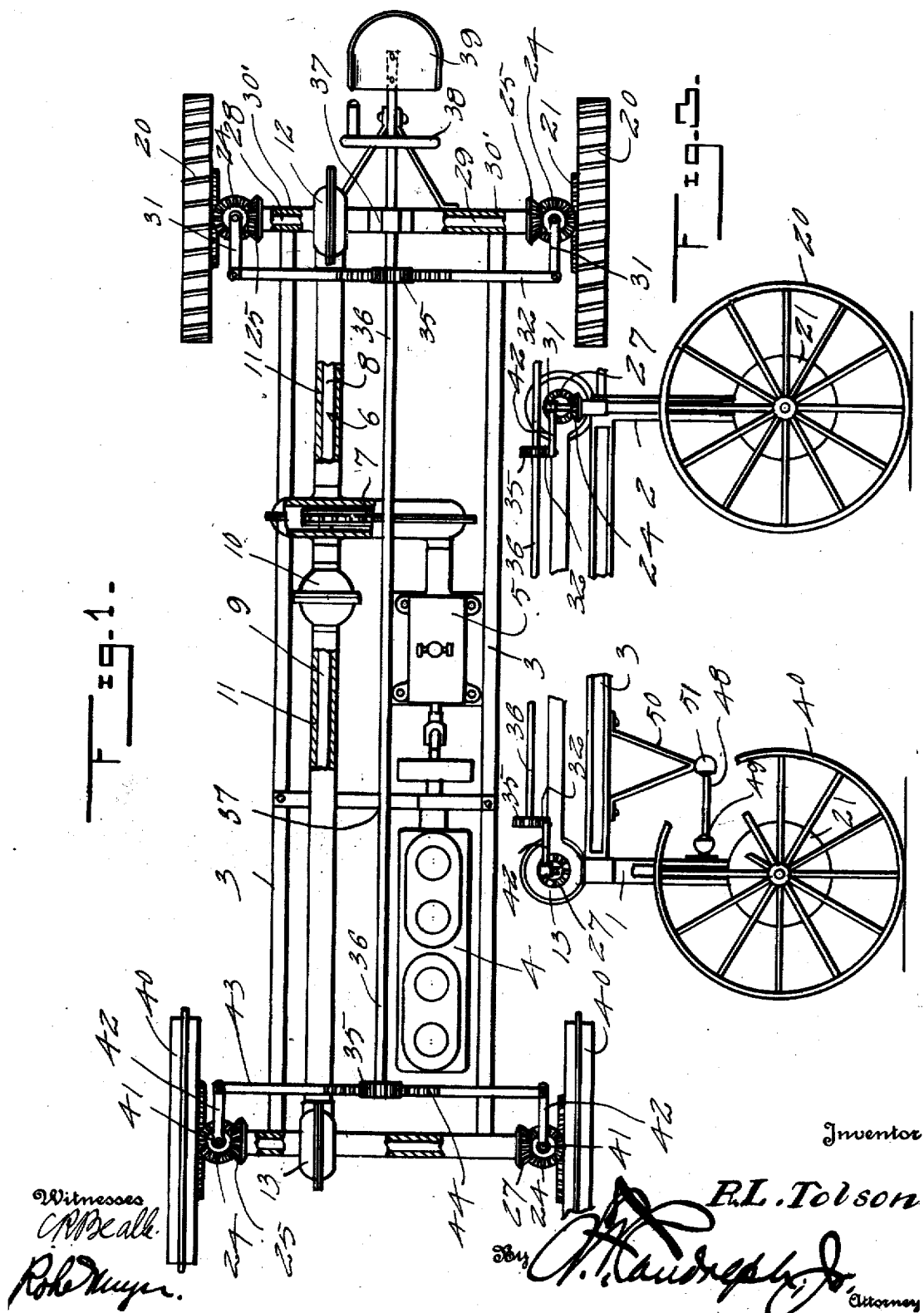
Witnesses
C. M. Beall.
Robt Myer.
Inventor
R. L. Tolson.
By
Attorney R. L. TOLSON.
TRACTOR.
APPLICATION FILED JAN. 11, 1918.
1,323,126.
Patented Nov. 25, 1919.
2 SHEETS—SHEET 2.
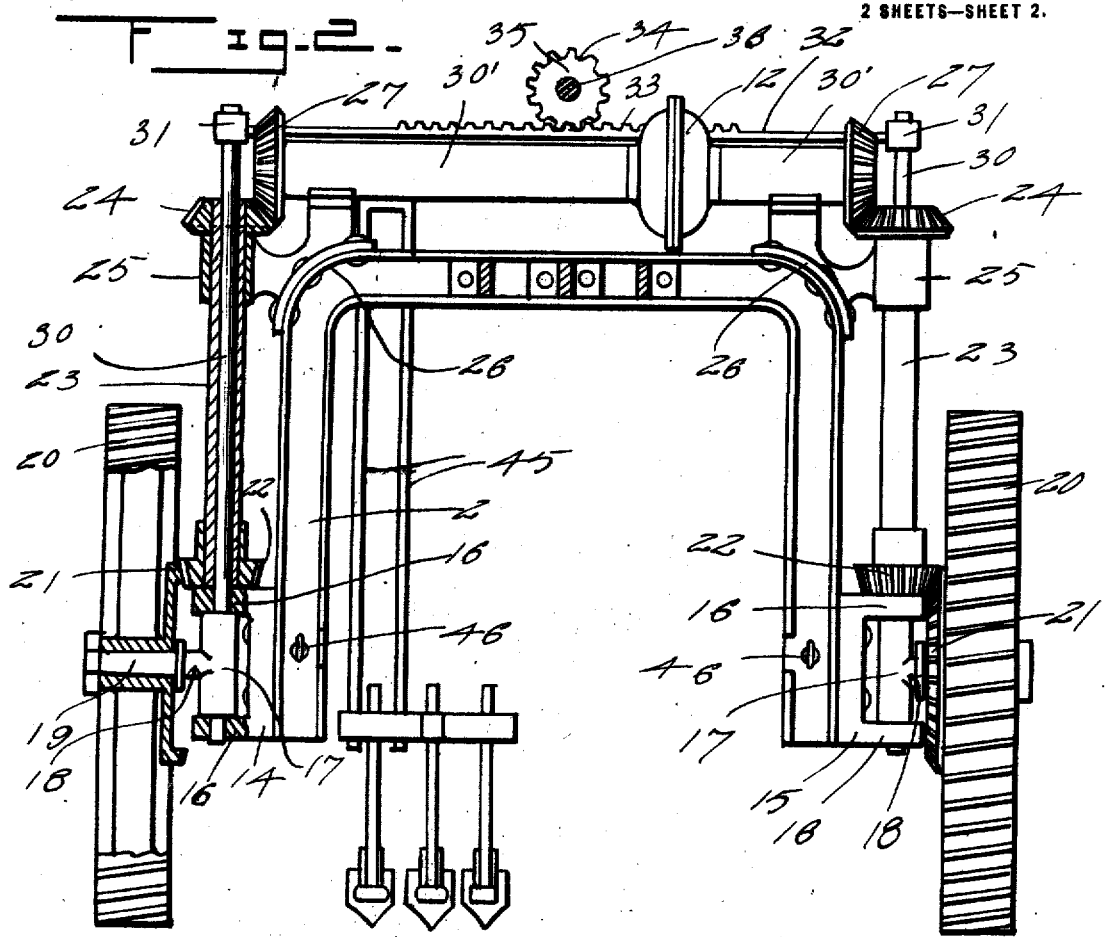

UNITED STATES PATENT OFFICE.

ROBERT LEE TOLSON, OF FORREST CITY, ARKANSAS, ASSIGNOR OF ONE-HALF TO WILLIAM LLOYD NEILL, OF FORREST CITY, ARKANSAS.

TRACTOR.

1,323,126.  Specification of Letters Patent.  Patented Nov. 25, 1919.

Application filed January 11, 1918. Serial No. 211,371.

*To all whom it may concern:*

Be it known that I, ROBERT L. TOLSON, a citizen of the United States, residing at Forrest City, in the county of St. Francis and State of Arkansas, have invented certain new and useful Improvements in Tractors; and I do hereby declare the following to be a full, clear, and exact description of the invention, such as will enable others skilled in the art to which it appertains to make and use the same.

This invention relates to a tractor which is primarily designed for use upon a farm to replace horses or mules, and the primary object of the invention is to provide a tractor structure of the four wheel drive type which is also constructed so that both the front and rear wheels may be steered in unison whereby the tractor may be turned in a relatively short space.

More specifically, the object of this invention is to provide a tractor structure including a supporting frame which is carried by arch axles and has its front and rear wheels connected to the lower ends of the arch axle by the usual type of stub axle and spindle to allow the wheels to be turned for steering the tractor and further to provide means connected to all of the wheels of the tractor for positively rotating the wheels to propel the tractor, which means includes a hollow shaft, through which the shaft which steers the wheels extends.

With the foregoing and other objects in view, this invention consists in such novel features of construction, combination and arrangement of parts as will be hereinafter more fully described, illustrated in the accompanying drawings and claimed.

In describing the invention in detail, reference will be had to the accompanying drawings wherein like characters designate like and corresponding parts throughout the several views, and in which:

Figure 1 is a top plan view of the tractor having parts broken away.

Fig. 2 is a fragmentary vertical section through the tractor.

Fig. 3 is a fragmentary side elevation of the tractor showing a radius rod attached to the front axle structure, and Fig. 4 is a view of a draw bar which is attached to the tractor structure.

Referring more particularly to the drawings, 1 designates the front arch axle of the tractor and 2 designates the rear arch axle. These arch axles may be made of channel iron or any similar material and they are arched to allow the tractor to pass over corn or other growing crops when it is used for drawing a cultivator structure.

The supporting frame 3 of the tractor is attached to the arch axles 1 and 2 in any suitable manner and it supports an engine or motor 4 of any standard make which is connected to a gear shift structure 5 of the ordinary construction. The gear shift structure 5 is connected to the main drive shaft 6 of the tractor through the medium of a silent chain 7. The shaft 6 is composed of sections 8 and 9 which are connected by a universal joint 10. The shaft sections 8 and 9 are inclosed in suitable casings 11 and they extend longitudinally of the frame of the tractor. The shaft section 8 has its rear end connected to an ordinary differential gear structure 12 while the forward end of the shaft section 9 is connected to an ordinary differential gear structure 13. The rear arch axle 2 has a pair of castings 14 and 15 attached to the outer sides of the lower ends of the legs of the same and these castings include horizontally extending bearing arms 16. The horizontal bearing arms 16 rotatably support the vertical portions 17 of stub shafts 18 upon the spindles 19 of which are mounted the rear supporting wheels 20 of the tractor. The rear supporting wheels 20 of the tractor have bevel gears 21 attached thereto which mesh with gears 22. The gears 22 are mounted upon the lower ends of hollow shafts 23 and these shafts have beveled gears 24 mounted upon their upper end. The vertical hollow shafts 23 are supported by suitable bearings 25 which are attached in any suitable manner as shown at 26 to the arch axle 2. The beveled gears 24 mesh with beveled gears 27 which are carried by the shafts 28 and 29 that are operatively connected to the shaft section 8 through the differential gear structure 12. Suitable housings 30' inclose the shafts 28 and 29.

Vertical shafts 30 extend through the hollow shafts 23 and have their lower ends connected to the stub axles 18. Arms 31 are connected to the upper end of the shaft 30 and to a cross rod 32. The cross rod 32 has rack teeth formed upon the upper surface of the same which mesh with the teeth 34 of a gear 35. The gear 35 is carried by the steering post or shaft 36. The steering post 36 is supported by suitable bearings 37 and it has a steering wheel 38 positioned upon the rear end of the same which is positioned in close proximity to the seat 39 so that the operator of the tractor may conveniently reach the steering wheel 38 from the seat 39 for steering the tractor.

The front supporting wheels 40 are driven from the shaft section 9 in identically the same manner in which the rear supporting wheels 20 are driven and they are steered by vertical shafts 41 which extend through the hollow operating shaft of the front gears and have arms 42 connected to their upper ends. The arms 42 are connected to a cross rod 43 which has rack teeth 44 formed upon its upper surface that mesh with a gear 35 carried by the forward end of the steering post 36 so that both the front wheels 40 and the rear wheels 20 will be steered in unison for guiding the tractor.

The supporting frame 3 of the tractor has a plurality of rods 45 connected thereto at any suitable place the lower ends of which rods may be connected to ordinary cultivating shovel gangs or any other agricultural implements suitable to be connected in this manner to the tractor and the rear arch axle 2 has a pair of eye bolts 46 carried thereby to which a draw bar 47 as illustrated in Fig. 4 of the drawings may be connected to provide means for connecting the tractor to a wagon, grain drills or similar devices.

A radius rod 48 is connected to the front axle 1 by a ball and socket joint 49 and to a depending bracket 50 by a second ball and socket joint 51 so as to allow the axle 1 to move as necessary when traveling over undulations in the ground.

From the foregoing description taken in connection with the accompanying drawings the advantages of construction and the method of operation of the improved tractor will be readily apparent to those skilled in the art to which this invention appertains and, while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:—

In a tractor structure, a pair of arched axles, means rigidly connecting the axles together, spindles pivotally carried by the lower ends of the arched axles, wheels rotatably mounted on the spindles, shafts secured to the spindles and extending above the arched axles, means connecting the forward and rear pairs of shafts together, a steering shaft extending longitudinally of the tractor structure, a steering wheel keyed to the rear end of said steering shaft, and means operatively connecting the steering shaft with the means connecting the forward and rear pairs of said spindle carried shafts, as and for the purpose specified.

In testimony whereof I affix my signature in the presence of two witnesses.

ROBERT LEE TOLSON.

Witnesses:
PORTER E. NEILL,
J. M. GILLIAM.